United States Patent

Günthner

[11] 3,967,947
[45] July 6, 1976

[54] METHOD OF MAKING A HOLLOW GLASS ARTICLE

[75] Inventor: Franz Günthner, Mainz-Lerchenberg, Germany

[73] Assignee: Jenaer Glaswerk Schott & Gen., Mainz, Germany

[22] Filed: Apr. 5, 1974

[21] Appl. No.: 458,490

[30] Foreign Application Priority Data
Apr. 11, 1973   Germany.............................. 2318116

[52] U.S. Cl. ........................................ 65/70; 65/75; 65/81; 65/122; 65/123; 65/124; 65/130; 65/209; 65/329
[51] Int. Cl.² ........................ C03B 9/00; C03B 5/30
[58] Field of Search ................. 65/70, 66, 329, 124, 65/130, 209, 75, 87, 81, 122, 123

[56] References Cited
UNITED STATES PATENTS

| | | |
|---|---|---|
| 1,592,299 | 7/1926 | Howard ........................... 65/329 X |
| 1,995,276 | 3/1935 | Howard ........................... 65/209 X |
| 2,098,186 | 11/1937 | Howard ........................... 65/329 X |
| 2,790,994 | 5/1957 | Cardot et al. ....................... 65/66 |
| 3,833,700 | 9/1974 | Adomaitis ........................ 65/66 X |

*Primary Examiner*—S. Leon Bashore
*Assistant Examiner*—Frank W. Miga
*Attorney, Agent, or Firm*—Burgess, Dinklage & Sprung

[57] ABSTRACT

Molding of hollow glass articles wherein a gob flows from a feeder into a mold and forms a hollow tube as it enters the mold, and a pressure differential is applied across the tube so that the tube is shaped in the mold to form the hollow article. During application of the pressure differential, deformation of the glass between the feeder and mold, is prevented by proximately positioning of the feeder and mold.

5 Claims, 11 Drawing Figures

METHOD OF MAKING A HOLLOW GLASS ARTICLE

BACKGROUND

The invention relates to a method of manufacturing hollow glass objects, in which the material to be formed is taken in the form of a closed-end tube from the feeder and aspirated or blown into a finish mold. By this method both closed hollow glass objects such as hollow spheres and open hollow glass objects such as bottles may be made.

This method makes it possible to manufacture hollow glass objects without the need for special tools for shaping the gob.

A process is already known (Germany Pat. No. DRP 513,479) in which a tube is formed from the melt and is blown into a mold. In this process, the lower edge of the feeder is held at a prescribed minimum distance from the upper edge of the blow mold during the blowing. The portion of the tube that is located between the top edge of the mold and the feeder and has a very low viscosity is expanded so greatly by the blow that it forms a very thin-walled bubble or bursts. This process has considerable disadvantages, namely:

The end of the strand remaining on the feeder can be reclosed only with difficulty because the cold portions created by the bursting first have to be reheated, and the excessively flared end of the tube has to be brought together, and a uniform distribution of masses approximately symmetrical to the main axis has to be established.

The fragments produced by the bursting interfere with production operations.

The excess glass protruding above the mold has to be removed, resulting in fragments.

The glass that is in the mold has to be blown tight again after the bursting of the tube. Due to the cooling of the glass by contact with the mold, this in only partially possible.

The heating and re-forming of the glass which has greatly cooled at the edges requires much time. The quality that can be achieved in the mouth of the bottle is low.

THE INVENTION

The object of the present invention is the creation of a process which does not have the above disadvantages and in which the part of the forming operation that is performed by means of the mold will take place continuously in a single procedure in which the tube between the mold and the feeder is not modified in a manner disadvantageous to the following operation.

In accordance with the invention this problem is solved by the process steps described in claim 1. Pressure or vacuum can be used. Through the alternative application of vacuum, furthermore, the manufacture of completely sealed hollow glass objects is made possible.

When the blowing method is used, care must be taken to shut off the blow pressure before the finish mold is lowered for the severance of the tube. During the blow the mold must be brought so close to the bottom edge of the feeder that the glass cannot penetrate into the gap between the finish mold and discharge ring of the feeder.

When the vacuum method is used, the finish mold may be at a distance of 5 to 20 mm from the feeder; more advantageously, however, it is urged against the feeder.

After the end of the main forming procedure the finish mold is lowered, either while the vacuum is still acting in the mold or after the blow pressure has been shut off, in order to sever the tube, the tube having already been constricted at the point of severance. The severing must be performed in such a manner, in accordance with the invention, that the two terminations formed by the severance are closed, i.e., a fully closed hollow body is produced in the finish mold, and a closed tube end is again available at the discharge from the feeder. This kind of severance is achieved by an appropriate tool, but may be aided by evacuation of the tube.

Through a variety of heating and shaping procedures, a few of which are described hereinafter, the finished product either remains a fully closed hollow body or it is transformed to a hollow body that is open at one end.

EMBODIMENTS

The invention will be further explained with reference to the drawing.

Figure 1:
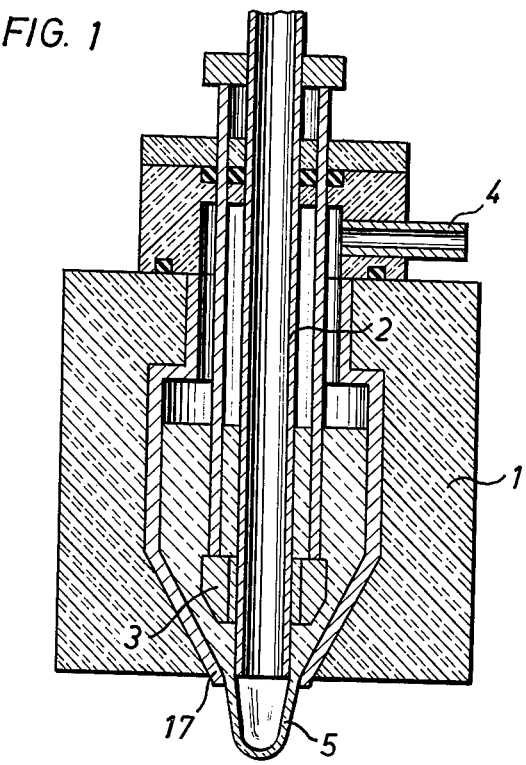
FIGS. 1-5, 6a and 6b show the manufacture of an open container.
Figure 2:
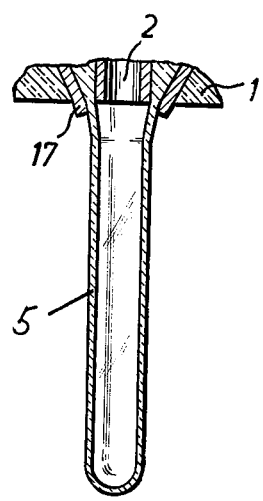

In the head of a gob feeder 1 (FIG. 1) there are disposed a blowpipe 2 whose height may be varied according to a program and a ring 3 whose height is also variable. The blowpipe 2 forms together with the orifice 17 an annular cross section through which the glass emerges in a known manner in the form of a tube 5 closed at one end. The speed of emergence in the individual phases of the formation of the tube is controlled by the position of the blowpipe 2 and the variable pressure on the surface of the molten glass. The compressed gas enters and leaves through pipe 4, the pressure assuming values over or under atmospheric pressure. Ring 3 serves to control the rate of flow within or above the orifice as the viscosity of the glass varies.

Figure 3:
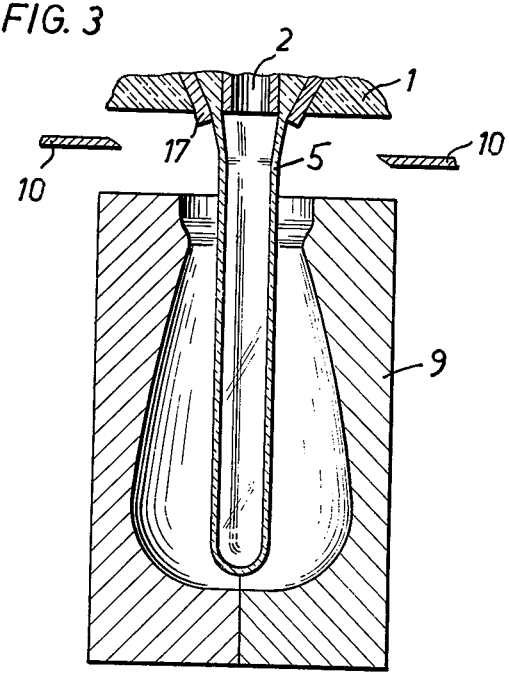
Figure 4:
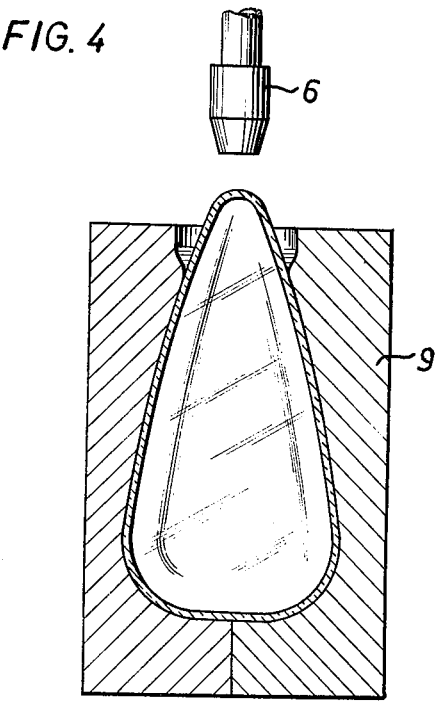
Figure 5:
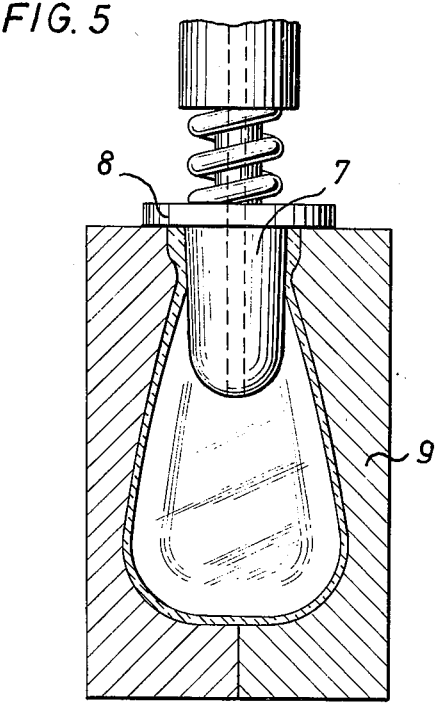

FIGS. 3 to 5 show the most important phases of a shaping process in which the glass is drawn against the mold wall by evacuating the finish mold 9. The evacuation is performed in a conventional manner with conventional means which are not represented here.

FIG. 3 shows the situation after the finish mold 9 has been closed and before evacuation begins. The finish mold is not yet urged against the bottom of the gob feeder 1.

FIG. 4 shows the portion of the tube which has been aspirated into the finish mold 9, severed by the knife 10, and thereby closed. Burner 6 heats the area at which the cut was made. The viscosity reduction, the kinetic energy of the flame, and the surface tension produce an opening which is shaped by the mandrel 7 and the ring 8 (FIG. 5).

Figure 6A:
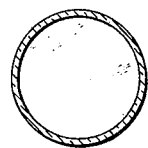
Figure 6B:
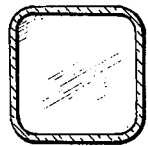

As in other shaping methods, objects having any desired cross section may be made by this method. Examples of round and cornered cross sections are shown in FIG. 6.

Figure 8:
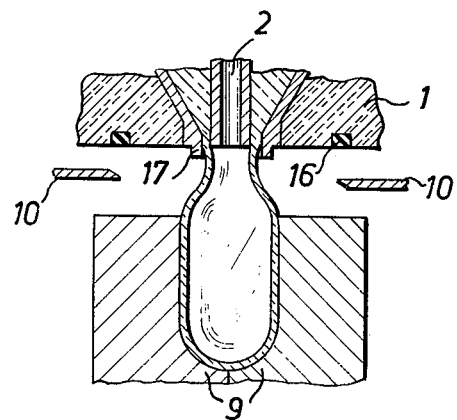
FIGS. 7 to 9 show the manufacture of a closed cylinder.
Figure 7:
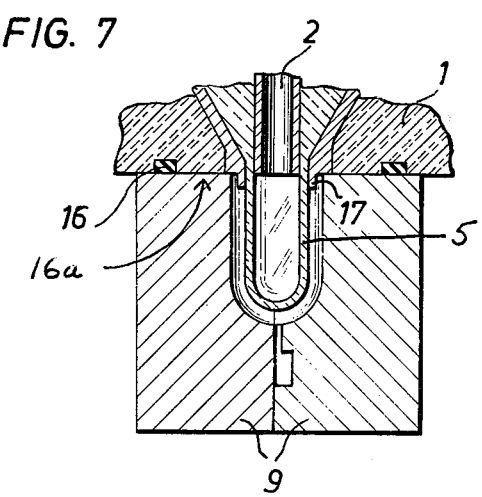

FIG. 7 shows how the finish mold 9 is urged against the gob feeder 1 as the tube is blown into the mold, and how it forms a small gap about 0.1 to 0.2 mm wide with the orifice 17. This gap is small enough to prevent glass from being forced through it. The finish mold 9 is sealed against the feeder by the sealing ring 16. The glass is blown to the finish mold 9 by means of air which is fed through the blowpipe 2. In this arrangement the glass may also be aspirated by known means. After the glass has been fully blown and sufficiently cooled the blow pressure is first reduced to atmospheric pressure, the finish mold is withdrawn from the feeder (by 5 to 20 mm, for example), and then the blow pressure is reduced below atmospheric pressure and the mold is further withdrawn until the hot strand continuing to flow from the feeder has constricted (FIG. 8) and is severed by knife 10 at the constriction. Further working to form objects having mouths is performed as described above.

Figure 9:
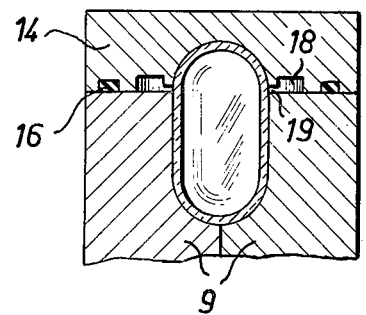

Closed objects may also be manufactured. To this end the cover 14 (FIG. 9) is pressed onto the finish mold and the air between the cover and the glass is pumped out through passage 18 and gap 19 until the glass has firmly contacted the inner wall of the cover.

Figure 10:
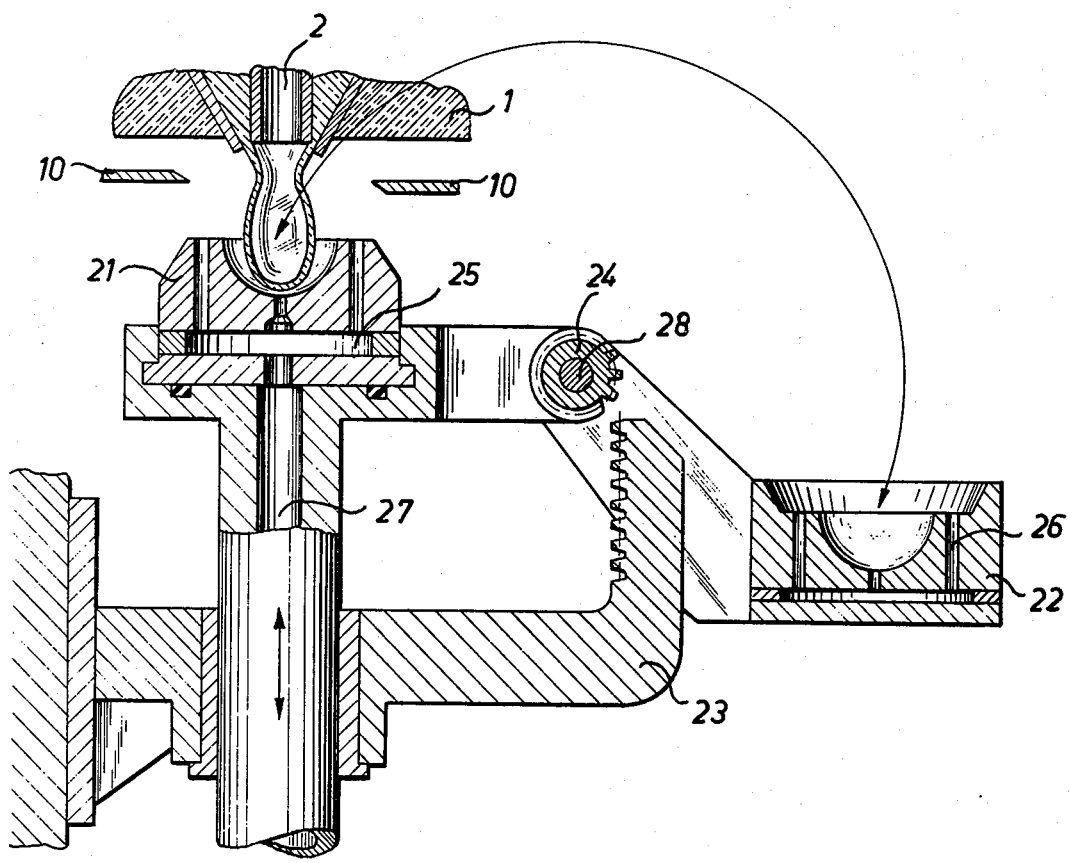
FIG. 10 shows the manufacture of a sealed hollow sphere.

Another application of this process is shown in FIG. 10. The mold half 21 picks up the fully closed piece of tubing just as it is severed by the knives, and moves downwardly. By means of rack 23 and pinion 24 the mold half 22, which is mounted for rotation on shaft 28, is placed sealingly onto mold half 21. Through the passages 27, 25 and 26 the air that is between the glass and the inside wall of the mold is pumped out and the glass is shaped into a hollow body having, in the present example, the form of a sphere. The velocity $c$ of the downwardly moved mold half 21 increases from the moment of severance, in which the mold is not moving, according to the formula $c = g \times t$, for no longer than it takes for the glass to be aspirated against the inside wall of the mold ($g$ = acceleration due to gravity). This is to prevent the glass from being cooled down partially by contacting the mold in certain areas before the glass is drawn simultaneously and completely against the mold surface by aspiration.

Referring to FIG. 7, the small gap described above in the description of that figure is between the feeder 1 and mold 9, indicated by the reference character 16$a$.

When aspiration is applied the mold must not necessarily be proximately positioned in relation to the feeder as long as the molten glass tube touches the rim of the finish mold so that a vacuum may build up within the mold. In this case the mold may be positioned in a distance up to 20 mm from the feeder. In case the molten glass tube does not contact the rim of the mold the latter must be closely positioned against the feeder so that a vacuum may build up within the mold.

I claim:

1. Method of making a hollow glass article, which comprises:
   a. discharging molten glass from a feeder in the form of a tube closed at one end, into a finishing mold,
   b. applying a pressure differential between the interior of the tube and the exterior thereof within the mold by blowing gas into the tube for shaping of the molten glass into the hollow article in the mold,
   c. preventing deformation of the tube between the feeder and mold due to said pressure differential by sealing of the feeder against the mold throughout application of said pressure differential,
   d. interrupting the blowing of gas into the tube and thereafter lowering of the mold relative to the feeder while the glass between the feeder and mold is still molten so that a neck forms interconnecting the hollow article in the mold and glass in the feeder, and
   e. with the mold in the lowered position, severing the glass in the feeder from the hollow article in the mold at said neck, said severing leaving the hollow article with a closed upwardly disposed neck portion and the glass from the feeder with a closed downwardly disposed neck portion.

2. Method according to claim 1, wherein constriction of the neck occurs in response to said lowering of the mold, prior to said severance.

3. Method according to claim 2, and applying vacuum within the neck to aid said constriction.

4. Method of claim 1, and the step of forming an opening in the hollow article in the closed neck thereof.

5. Method according to claim 1, wherein said severing is effected by pinching and cutting the neck.

* * * * *